Feb. 12, 1946.  J. N. DETRICK  2,394,670
DIELECTRIC MATERIAL
Filed July 10, 1942
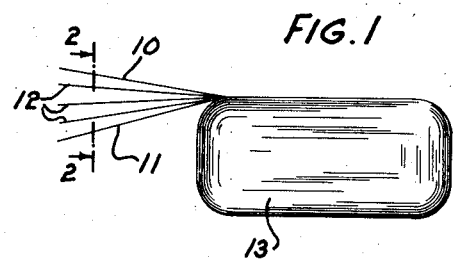
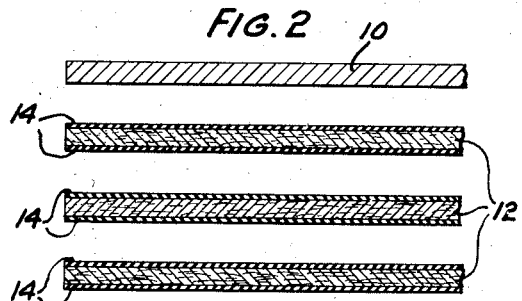
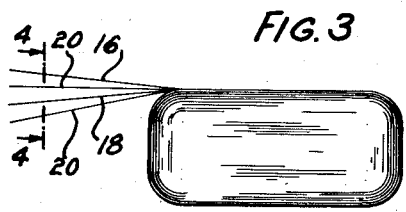
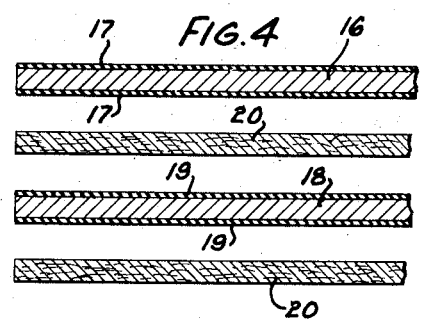
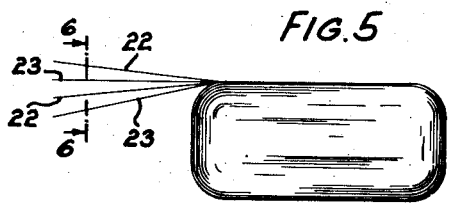
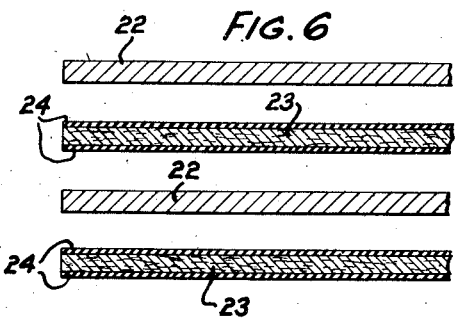
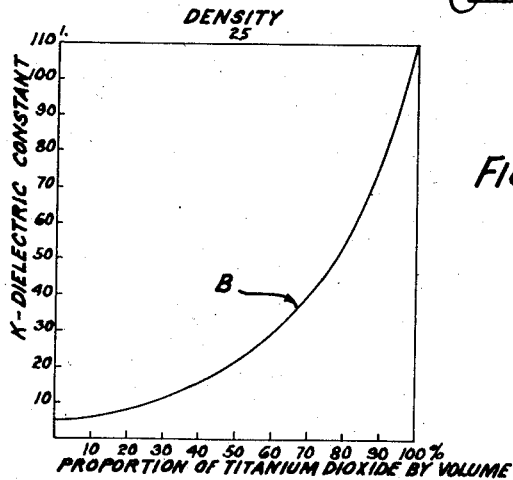
INVENTOR
J. N. DETRICK
BY
ATTORNEY Patented Feb. 12, 1946

2,394,670

UNITED STATES PATENT OFFICE 2,394,670

DIELECTRIC MATERIAL

Judson N. Detrick, Oak Park, Ill., assignor to Western Electric Company, Incorporated, New York, N. Y., a corporation of New York Application July 10, 1942, Serial No. 450,429

3 Claims. (Cl. 175—41)

This invention relates to dielectric materials and more particularly electrostatic condensers embodying such dielectric materials.

An object of the present invention is to provide an improved dielectric material for an electrostatic condenser so as to obtain high capacity in proportion to volume and improved operating characteristics in the condenser.

In some types of electrostatic condensers a strip of paper may be provided with a coating of dielectric material, and the coated strip positioned between two metal electrodes. The capacity of such a condenser is inversely proportional to the distance between the electrodes and directly proportional to the dielectric constant of the insulating medium, i. e., the dielectric between the electrodes, other factors being equal. It is, therefore, desirable to employ a material having a high dielectric constant and at the same time to apply this material to the supporting strip in a thin, dense layer in order to obtain maximum unit capacity and to minimize the required electrode area and the ultimate size and cost of the condenser.

Certain crystalline materials possess very high dielectric constants in comparison with paper or mica. For example, titanium dioxide crystals have a specific inductive capacity as high as 170 along their principal or major axis and approximately 90 along their transverse axis. A random or unoriented mixture of titanium dioxide crystals has a dielectric constant of about 110. However, the use of titanium dioxide as a dielectric material is subject to certain limitations and a primary limitation has been the difficulty in applying the titanium dioxide to the condenser electrodes in a sufficiently thin and dense layer.

In accordance with one embodiment of this invention, a paper or foil base is provided with a coating of finely divided titanium dioxide crystals suspended in a binder of polyvinyl alcohol. The coated base is then dried, calendered, and positioned between two electrodes to form a condenser having a high capacity relative to its volume.

In accordance with another embodiment of this invention, a pair of condenser electrodes are provided with a thin insulating film of polyvinyl alcohol and a single dielectric body positioned therebetween.

In accordance with a further embodiment of this invention, a sheet of paper may be provided with a coating of polyvinyl alcohol to form a dielectric body, and this body positioned between two electrodes to form an electrostatic condenser.

Other objects and advantages of this invention will be apparent from the following detailed description taken in conjunction with the following drawing, wherein Fig. 1 shows diagrammatically a condenser constructed in accordance with one embodiment of this invention;

Fig. 2 is an enlarged cross sectional view along line 2—2 of Fig. 1;

Fig. 3 shows diagrammatically a condenser constructed in accordance with another embodiment of this invention;

Fig. 4 is an enlarged cross sectional view along the line 4—4 of Fig. 3;

Fig. 5 shows diagrammatically a condenser constructed in accordance with a further embodiment of this invention;

Fig. 6 is an enlarged cross sectional view along the line 6—6 of Fig. 5, and

Fig. 7 is a graph showing the effect of a binder on the dielectric constant of a mixture of titanium dioxide.

The capacity of a condenser depends in part on the dielectric constant of the dielectric material used. Titanium dioxide, which, when its crystals are in a random or unoriented position, has a dielectric constant of 110, may be suspended in a binder having a much lower dielectric constant. The net dielectric constant of the dielectric body so formed will be lower than that of the titanium dioxide alone. At the same time, in order to obtain maximum effective dielectric constant in the dielectric body, the particles of dielectric material must be bound together as closely and densely as possible. Thus, it is desirable that a minimum amount of binder material be used commensurate with satisfactory binding.

Polyvinyl alcohol has a dielectric constant which, although higher than that of many dielectric materials, is substantially lower than that of titanium dioxide. However, a very small amount of polyvinyl alcohol will bind together a proportionately great amount of titanium dioxide; for example, 100 grams of polyvinyl alcohol will bind 3200 grams of titanium dioxide into a tough body suitable for use as the dielectric body in a condenser. From 2.5% to 10% of polyvinyl alcohol as a binder gives satisfactory results.

Polyvinyl alcohol is water soluble and, when wet, swells to many times its dry volume. A large weight percentage of titanium dioxide may be dispersed in an aqueous solution of polyvinyl alcohol and will form a relatively stable suspension. Upon drying, the polyvinyl alcohol shrinks to its original dry volume, thus binding the titanium dioxide crystals firmly together to form an extremely dense body. Since a relatively small amount of polyvinyl alcohol is used, to a large degree the dielectric constant of the dielectric body will represent the dielectric constant of the titanium dioxide. The effect on dielectric constant of polyvinyl alcohol or any binder in a mixture with titanium dioxide is shown in Fig. 7 from which it will be seen that the average dielectric constant rises steeply as the percentage of binder is decreased.

In accordance with one embodiment of this invention, a dielectric coating composition having satisfactory physical and electrical characteristics for coating a foil or paper base may be prepared by mixing in a suitable apparatus, such as a ball mill, 100 grams of polyvinyl alcohol, 1600 grams of titanium dioxide, and 2900 cc. of distilled water. The composition thus obtained is coated on a base 12 of foil, cloth or paper, or other suitable material as shown in Figs. 1 and 2, to form a dielectric film 14 approximately .00035" thick. Since the binder is an aqueous suspension, a water proofed paper, or paper having high wet strength, should be used. The thickness of the coating may be increased by decreasing the amount of water used, or decreased by increasing the amount of water used as a solvent for the binder. The thickness of the coating may also be controlled to a certain degree by the speed with which the material is passed through the coating material.

The coated base may then be calendered or pressed to compact the coating. A water strong paper that may be used in the manufacture of condensers is approximately .0017" thick. When coated with a composition prepared as described above, the coated paper will have a thickness of approximately .003". The coated paper may then be reduced in thickness by calendering between steel rolls and a reduction in thickness of from 40% to 70% may be achieved in this way. Since the capacity of the condenser is inversely proportional to the thickness of the dielectric body, a reduction in thickness of the dielectric body will result in an increase in capacity of the condenser.

The coated and calendered strip may then be further dried by heating. The period of heat treatment depends on the water retentivity of the coating. The removal of the water tends to increase the insulating properties of the polyvinyl alcohol and to further densify the coating by causing the polyvinyl alcohol to shrink. The coated, calendered, and dried strip may then be positioned between two metal plates or electrodes, or wound between two metal strips 10 and 11 to form an electrostatic condenser 13.

In accordance with another embodiment of this invention, the insulating and film forming qualities of polyvinyl alcohol may be utilized by coating the electrodes of a condenser with polyvinyl alcohol to form an insulating film thereover. Usually dielectric bodies are made up of several sheets, or strips of material, multiple layers being used to avoid the effect of possible pin holes and conducting spots in the sheets, it being very unlikely that several pin holes or conducting spots would coincide to permit a short circuit between the electrodes. However, by providing the electrodes themselves with a thin insulating coating, the necessity of using laminated dielectric bodies is obviated, thus permitting the use of thinner dielectric bodies with proportional increase in condenser capacity.

In accordance with this embodiment of the present invention, aqueous solution comprising, for example, up to 7% of polyvinyl alcohol may be coated on a pair of metallic electrodes 16 and 18 to form insulating films 17 and 19 on the electrodes 16 and 18 respectively. The coating may then be dried by heating. In this way, a tough, dielectric insulating film as thin as .0002" may be obtained. A film of polyvinyl alcohol as thin as .0002" is tough enough to be peeled from a spatula without breaking. The insulating properties of the film are such that it will withstand voltages as high as 150 volts. A dielectric body such as a single paper strip is then positioned between the coated electrodes to form a condenser. The use of a single layer condenser body is made possible by the fact that the electrodes are provided with an insulating coating and therefore the possible presence of pin holes or conducting spots in the paper, is of no serious import. The paper strip may be coated with a dielectric material depending on the dielectric qualities required.

In accordance with a further embodiment of this invention, a strip of paper may be coated on both sides with polyvinyl alcohol to form a dielectric film 24, the coating dried, the coated paper 23 calendered or rolled to reduce its thickness and to compact the coating, and then positioned between two electrodes 22, as shown in Figs. 5 and 6, to form an electrostatic condenser. The polyvinyl alcohol forms a very thin, tough insulating film on the paper. When dried and calendered, the total thickness of the film on the paper may be only .0002". Thus, the electrodes may be positioned very closely together with consequent increase in condenser capacity.

While but three embodiments of this invention have been shown and described, it will be understood that many changes and modifications may be made therein without departing from the scope of the present invention.

What is claimed is:

1. A condenser comprising a pair of electrodes and a dielectric film between said electrodes of comminuted dielectric material in a binder of polyvinyl alcohol.

2. A condenser comprising a pair of electrodes and a dielectric film between said electrodes of a comminuted titanium compound in a binder of polyvinyl alcohol.

3. A condenser comprising a pair of electrodes and a dielectric film between said electrodes of comminuted titanium dioxide in a binder of polyvinyl alcohol.

JUDSON N. DETRICK.